United States Patent
Ju et al.

(10) Patent No.: US 8,626,551 B2
(45) Date of Patent: Jan. 7, 2014

(54) MOTIVATING EQUITABLE BEHAVIOR IN CALENDAR EVENTS

(75) Inventors: Lin Ju, Beijing (CN); Patrick J. O'Sullivan, Ballsbridge (IE); Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 12/347,494

(22) Filed: Dec. 31, 2008

(65) Prior Publication Data

US 2010/0169149 A1    Jul. 1, 2010

(51) Int. Cl.
  *G06Q 10/00* (2012.01)
(52) U.S. Cl.
  USPC ........ 705/7.19; 705/7.13; 705/7.15; 705/7.18
(58) Field of Classification Search
  USPC .............................. 705/7.13, 7.15, 7.18, 7.19
  See application file for complete search history.

(56) References Cited

U.S. PATENT DOCUMENTS

| | | | |
|---|---|---|---|
| 5,197,000 A * | 3/1993 | Vincent ........................ 705/7.19 |
| 5,408,663 A | 4/1995 | Miller | |
| 5,692,125 A | 11/1997 | Schloss et al. | |
| 5,890,131 A | 3/1999 | Ebert et al. | |
| 6,006,215 A | 12/1999 | Retallick | |
| 6,311,191 B1 | 10/2001 | Retallick | |
| 6,442,567 B1 | 8/2002 | Retallick et al. | |
| 7,058,660 B2 | 6/2006 | Scott | |
| 7,693,736 B1 * | 4/2010 | Chu et al. ..................... 705/7.19 |
| 2001/0014867 A1 * | 8/2001 | Conmy ............................. 705/9 |
| 2003/0149606 A1 * | 8/2003 | Cragun et al. ..................... 705/8 |
| 2003/0204474 A1 * | 10/2003 | Capek et al. .................... 705/64 |
| 2006/0293943 A1 * | 12/2006 | Tischhauser et al. ............ 705/9 |
| 2007/0005406 A1 * | 1/2007 | Assadian et al. ................. 705/8 |
| 2009/0112984 A1 * | 4/2009 | Anglin et al. ................. 709/204 |

OTHER PUBLICATIONS

Dusseault, Lisa; Whitehead, Jim. Open Calendar Sharing and Scheduling with CalDAV. IEEE Internet Computing 9.2 (Mar. 2005): 81-89.*
Meeting Maker Launches Comprehensive, Scalable and Extensible Collaborative Scheduling Platform. Business/Technology Editors. Business Wire [New York] May 14, 2002: 1.*
Meeting Maker Calendar Scheduling Software Features & Benefits, published Mar. 28, 2008 (available at http://web.archive.org/web/20080328231530/http://www.peoplecube.com/ products-meeting-maker-features.htm), 5pgs.*

* cited by examiner

*Primary Examiner* — Lynda Jasmin
*Assistant Examiner* — Timothy Padot
(74) *Attorney, Agent, or Firm* — Holland & Knight, LLP; Brian J. Colandreo, Esq.; Jeffrey T. Placker, Esq.

(57) ABSTRACT

An event scheduling request is received, and a disruption factor is associated with each of a plurality of invitees. The disruption factor is based upon, at least in part, an event parameter and at least one invitee attribute. An event is scheduled based upon, at least in part, the disruption factors associated with each of the plurality of invitees.

14 Claims, 5 Drawing Sheets

MOTIVATING EQUITABLE BEHAVIOR IN CALENDAR EVENTS

TECHNICAL FIELD

The present disclosure generally pertains to electronic calendaring systems, and more particularly to scheduling collaborative events in electronic calendaring systems.

BACKGROUND

Increasingly, various communications systems are being used to allow collaboration between geographically separate individuals. Such collaboration may be achieved through the use of teleconferences, web conferences, and the like. As such, individuals located all around the world may conveniently work together on common projects, and the like. Calendaring systems may provide a valuable tool for managing such collaborative events. However, the time and location (e.g., which may include the meeting medium, such as a teleconference) are generally up to the discretion of the individual who actually schedules the collaborative event. It may often be the case that the individual scheduling the collaborative event may schedule the collaborative event according to the scheduler's preferences and convenience. The preferences and convenience of other parties to the collaborative event, who may, for example, be separated from the scheduler by many time zones, may not always be fully considered.

SUMMARY OF THE DISCLOSURE

In a first implementation, a computer program product includes a computer readable medium having a plurality of instructions stored on it. When executed by a processor, the instructions cause the processor to perform operations including receiving an event scheduling request. A disruption factor is associated with each of a plurality of invitees. The disruption factor is based upon, at least in part, an event parameter and at least one invitee attribute. An event is scheduled based upon, at least in part, the disruption factors associated with each of the plurality of invitees.

One or more of the following features may be included. The at least one event parameter may include one or more of an event time and an event location. The at least one invitee attribute may include a time zone location of an invitee. The instructions for associating the disruption factor with each of the plurality of invitees may include instructions for associating a weighting factor with each of the plurality of event invitees. The weighting factor may be based upon, at least in part, an invitee characteristic.

The instructions for scheduling the event based upon, at least in part, the disruption factors associated with each of the plurality of invitees may include instructions for recommending one or more of an alternative time and an alternative location. Instructions may also be included for enforcing one or more of the alternative time and the alternative location.

According to another implementation, a computing system includes a processor and a memory module coupled with the processor. A first software module is executable by the processor and the memory module. The first software module is configured to receive an event scheduling request. A second software module is executable by the processor and the memory module. The second software module is configured to associate a disruption factor with each of a plurality of invitees. The disruption factor is based upon, at least in part, an event parameter and at least one invitee attribute. A third software module is executable by the processor and the memory module. The third software module is configured to schedule an event based upon, at least in part, the disruption factors associated with each of the plurality of invitees.

One or more of the following features may be included. The at least one event parameter may include one or more of: an event time and an event location. The at least one invitee attribute may include a time zone location of an invitee. The second software module, which may be configured to associate the disruption factor with each of the plurality of invitees, may be further configured to associate a weighting factor with each of the plurality of event invitees. The weighting factor may be based upon, at least in part, an invitee characteristic.

The third software module, which may be configured to schedule the event based upon, at least in part, the disruption factors associated with each of the plurality of invitees, may be further configured to recommend one or more of an alternative time and an alternative location. The computing system may include a fourth software module that may be executable by the processor and the memory module. The fourth software module may be configured to enforce one or more of the alternative time and the alternative location.

According to yet another implementation, a computer implemented method includes receiving an event scheduling request, and associating a disruption factor with each of a plurality of invitees. The disruption factor is based upon, at least in part, an event parameter and at least one invitee attribute. An event is scheduled based upon, at least in part, the disruption factors associated with each of the plurality of invitees. The scheduled event may be stored on a computer readable medium coupled to a computing device.

One or more of the following features may be include. The at least one event parameter may include one or more of: an event time and an event location. The at least one invitee attribute may include a time zone location of an invitee. Associating the disruption factor with each of the plurality of invitees may include associating a weighting factor with each of the plurality of event invitees.

Scheduling the event based upon, at least in part, the disruption factors associated with each of the plurality of invitees may include recommending one or more of an alternative time and an alternative location. The method may also include enforcing one or more of the alternative time and the alternative location.

The details of one or more implementations are set forth in the accompanying drawings and the description below. Other features will become apparent from the description, the drawings, and the claims.

DETAILED DESCRIPTION OF EXEMPLARY EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could be another suitable medium which can be electronically captured, via, for instance, optical scanning of the medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
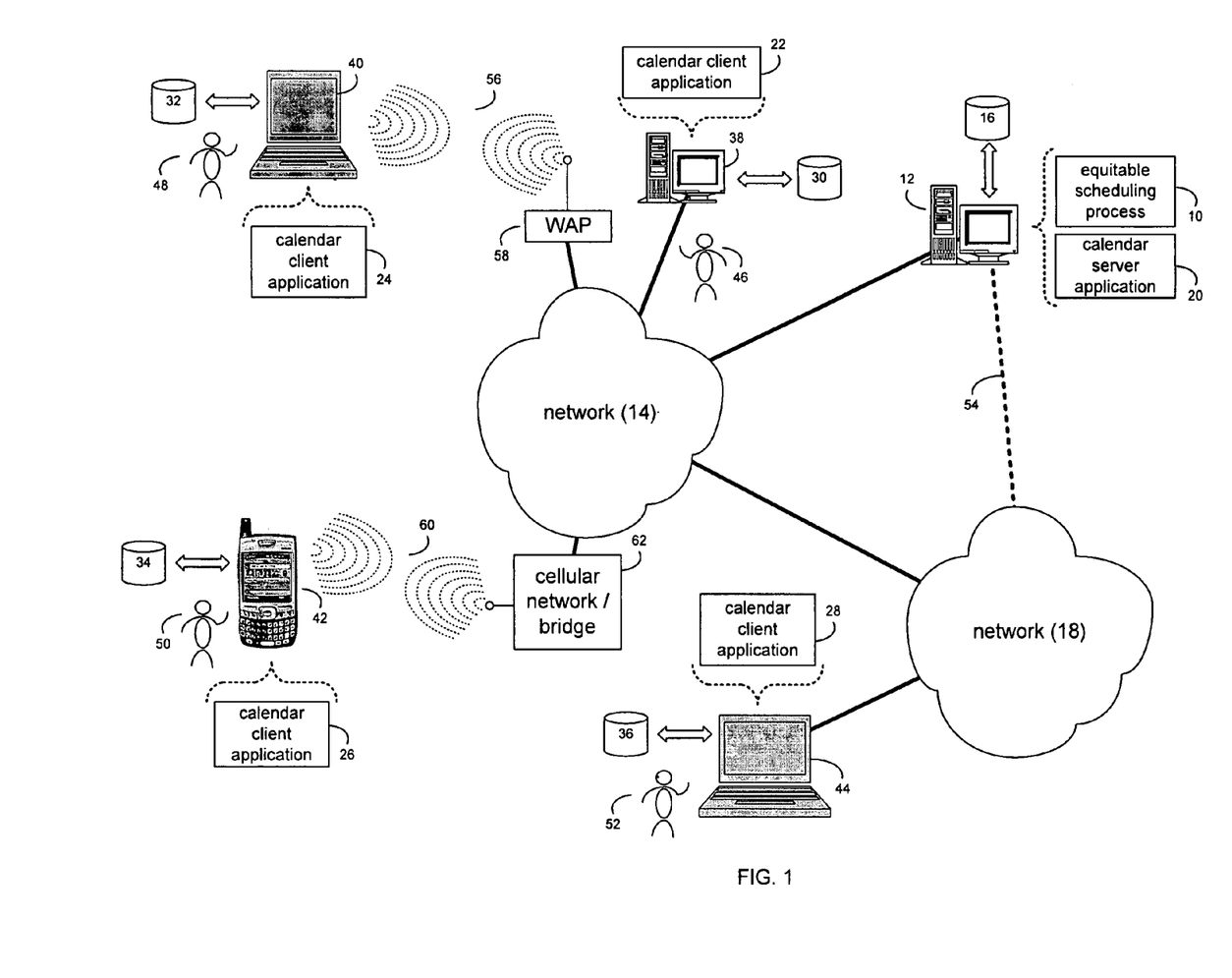
FIG. 1 diagrammatically depicts an equitable scheduling process and a calendaring application coupled to a distributed computing system.

Referring to FIG. 1, there is shown equitable scheduling process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

As will be discussed below in greater detail, equitable scheduling process 10 may receive 100 an event scheduling request. Further, equitable scheduling process 10 may associate 102 a disruption factor with each of a plurality of invitees. The disruption factor associated 102 with each of the plurality of invitees may be based upon, at least in part, an event parameter and at least one invitee attribute. Equitable scheduling process 10 may scheduled 104 an event based upon, at least in part, the disruption factors associated with each of the plurality of invitees.

The instruction sets and subroutines of equitable process 10, which may be configured as one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute calendaring server application 20, examples of which may include but are not limited to Lotus Domino® Server and Microsoft Exchange Server® (Domino is a trademark of International Business Machines Corporation in the United States, other countries, or both; and Microsoft Exchange Server is a registered trademark of Microsoft Corporation in the United States, other countries, or both). Calendaring server application 20 may be a collaboration software platform that may allow meetings, appointments, an the like to be scheduled via calendaring client applications 22, 24, 26, 28, examples of which may include but are not limited to Lotus Notes® and Microsoft Outlook® (Lotus Notes is a trademark of International Business Machines Corporation in the United States, other countries, or both; and Outlook is a registered trademark of Microsoft Corporation in the United States, other countries, or both). Equitable scheduling process 10 may be a stand alone application that interfaces with calendaring server application 20 or an applet/application that is executed within calendaring server application 20.

The instruction sets and subroutines of calendaring server application 20, which may be configured as one or more software modules, and which may be stored on storage device 16 coupled to server computer 12 may be executed by one or more processors (not shown) and one or more memory modules (not shown) incorporated into server computer 12.

While the equitable scheduling process is shown and described as residing on, and being executed by, server computer 12, other implementations may equally be utilized. For example, the equitable scheduling process may be a client-side process stored on one or more storage devices (e.g., storage devices 30, 32, 34, 36) coupled to one or more client electronic devices (e.g., client electronic devices 38, 40, 42, 44; respectively). In such an implementation, the equitable scheduling process may be a stand alone application that interfaces with a calendaring client application (e.g., one or more of calendaring client application 22, 24, 26, 28) or an applet/application that is executed within a calendaring client application. As such, the equitable scheduling process may be a server-side process executed on server computer 12, a client-side process executed by one or more client electronic device (e.g., one or more of client electronic devices 38, 40, 42, 44), or a hybrid client-side/server-side process, executed in part by server computer 12 and one or more client electronic device (e.g., one or more of client electronic devices 38, 40, 42, 44).

The instruction sets and subroutines of calendaring client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may allow users to e.g., created, receive, and manage email messages.

Users 46, 48, 50, 52 may access calendaring server application 20 directly through the device on which the calendaring client application (e.g., calendaring client applications 22, 24, 26, 28) is executed, namely client electronic devices 38, 40, 42, 44, for example. Users 46, 48, 50, 52 may access calendaring server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsofti Windows®, Microsoft Windows CE®, Red Hat® Linux®, or a custom operating system (Windows CE is a registered trademark of Microsoft Corporation in the United States, other countries, or both).

Figure 2:
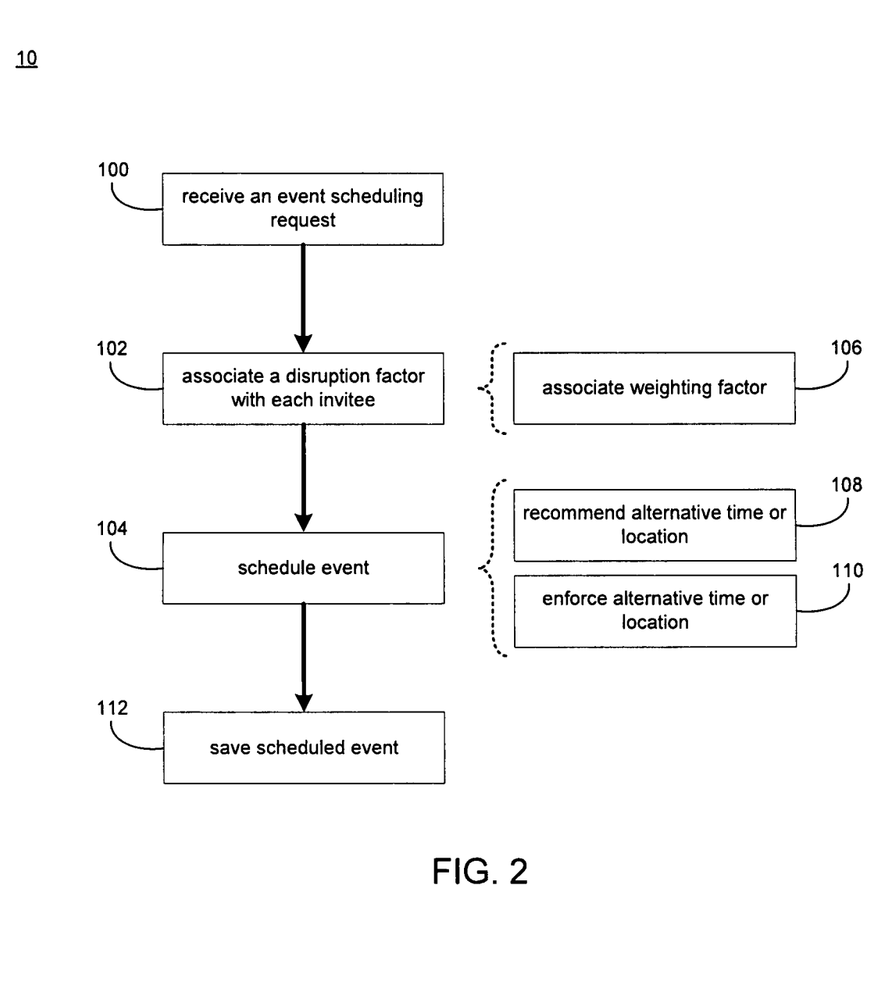
FIG. 2 is a flow chart of a process performed by the equitable scheduling process of FIG. 1.

Referring also to FIG. 2, equitable scheduling process 10 may receive 100 an event scheduling request. Further, equitable scheduling process 10 may associate 102 a disruption factor with each of a plurality of invitees. The disruption factor associated 102 with each of the plurality of invitees may be based upon, at least in part, an event parameter and at least one invitee attribute. Equitable scheduling process 10 may schedule 104 the event based upon, at least in part, the disruption factors associated with each of the plurality of invitees.

Figure 3:
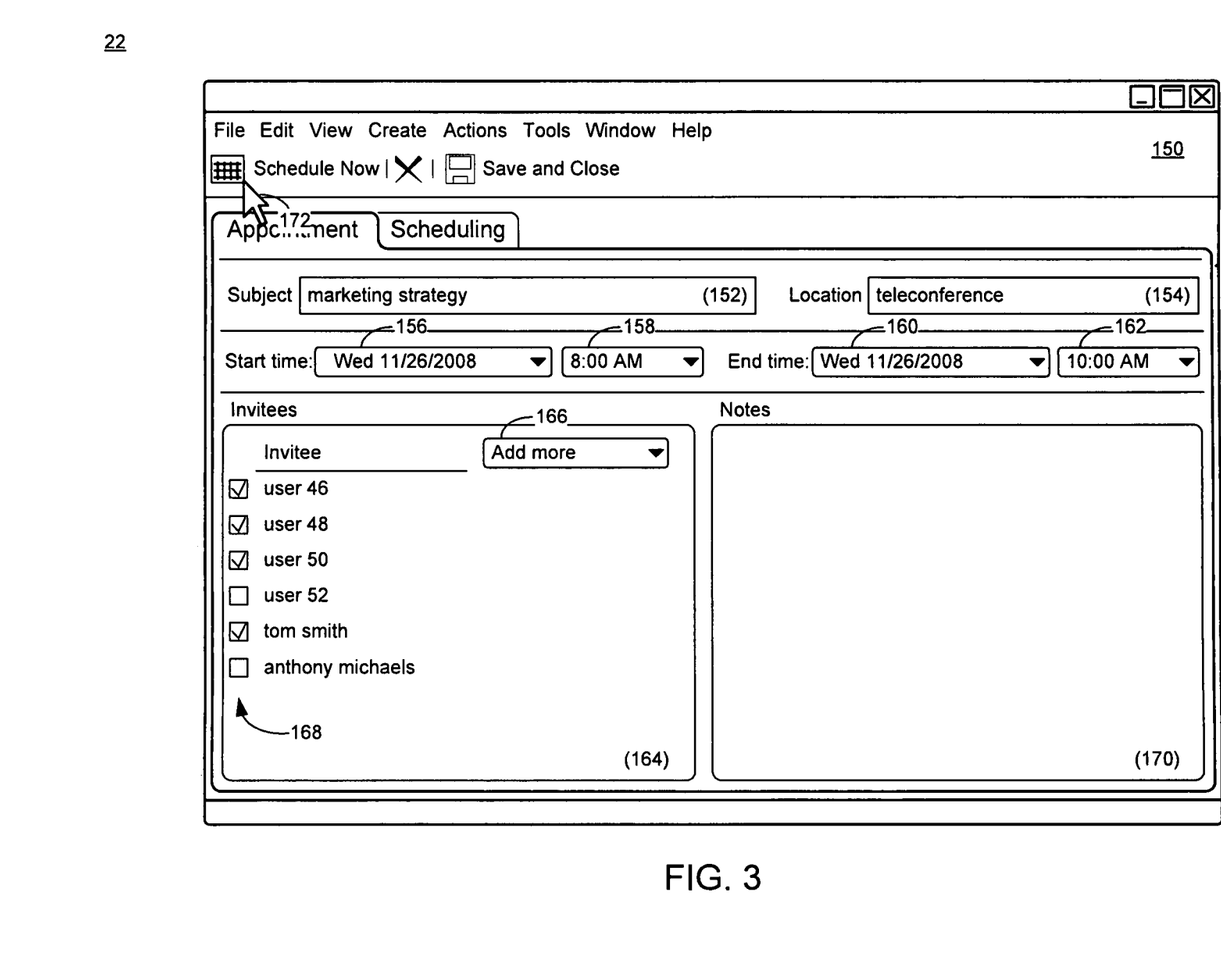
FIG. 3 diagrammatically depicts a scheduling user interface that may be rendered by the equitable scheduling process and/or the calendaring application of FIG. 1.

For example, and referring also to FIG. 3, a user (e.g., user 46) may schedule an event (e.g., a meeting) via scheduling user interface 150 (e.g., which may be provided by calendaring client application 22 alone or in conjunction with calendaring server application 20, and/or equitable scheduling process 10). Via scheduling user interface 150, and using one or more input devices, such as a keyboard (not shown) and a mouse (not shown), user 46 may specify, for example, a subject of the meeting (namely, "marketing strategy") in subject field 152, and a location of the meeting (namely, "teleconference") in location field 154. Similarly, user 46 may specify a start time (e.g., using pull-down menus 156, 158), and an end time (e.g., using pull-down menus 160, 162). Further, user 46 may define invitees to the meeting, e.g., in invitee pane 164. For example, user 46 may directly define the invitees (e.g., by inputting an email address, or other identifier, of one or more intended invitees), and/or may select invitees via pull-down menu 166 (e.g., which may allow user 46 to select one or more invitees from a personal contacts list, and organization contacts list, such as and LDAP directory, or the like). Additionally, user 46 may specify whether individual invitees are necessary for the meeting or options, e.g., by checking associated checkboxes 168, generally. Further any notes or other information relevant to the meeting may be input in notes pane 170.

Once user 46 has defined the various attributes of the meeting, user 46 may select, e.g., using onscreen pointer 172 (which may be controlled by a pointing device, such as a mouse; not shown), "Schedule Now" option from a tool bar of scheduling user interface 150. In response to user 46 selecting "Schedule Now," equitable scheduling process 10 may receive 100 an event scheduling request. Equitable scheduling process 10 may associate 102 a disruption factor with each of a plurality of invitees. The disruption factor associated 102 with each of the plurality of invitees may be based upon, at least in part, an event parameter and at least one invitee attribute. The disruption factor may be based upon, for example, a likelihood that the proposed event (i.e., the meeting) may be disruptive and/or inconvenient to an invitee (e.g., in absolute terms and/or by comparison to the disruption and/or inconvenience that the meeting may present to another invitee).

The at least one event parameter, upon which the disruption factor associated with each of the plurality of invitees may be, at least in part, based, may include one or more of an event time and an event location. The event location may include a physical/geographic location, and may additionally/alternatively include an event format, such as a teleconference, a web conference, a virtual meeting (e.g., utilizing a common team room), or the like. Further, the at least one invitee attribute, upon which the disruption factor associated with each of the plurality of invitees may be, at least in part, based, may include a time zone location of an invitee. Additionally/alternatively, the at least one invitee attribute may be based upon, at least in part, a location of an invitee. For example, the disruption factor may be based upon, at least in part, a holiday schedule local to an invitee. For example, a meeting scheduled for July 4$^{th}$ may be disruptive and/or inconvenient for an invitee in the United States of America, and July 4$^{th}$ is a national holiday. However, July 4$^{th}$ may not be disruptive for an invitee outside of the United States of America. Accordingly, a disruption factor indicative of a likely disruption/inconvenience may be associated with the invitee in the United States of America, which a disruption factor associated with an invitee outside of the United States of America may not be indicative of a likely disruption/inconvenience.

Continuing with the above-stated example, the meeting scheduled by user 46 may be scheduled for the time slot of 8:00 AM-10:00 AM on Wednesday Nov. 26, 2008. User 46 may be located in Boston, Mass., placing the time zone reference for the meeting as Easter Standard Time. Further, assume that user 48, user 50, user 52, and Tom Smith are all located in Sydney, Australia, while user 46 and Anthony Michaels may be located in Boston, Mass. As such, the proposed start time for the meeting would be 12:00 AM for user 48, user 50, user 52, and Tom Smith. As such, the proposed time for the meeting may be disruptive for user 48, user 50, user 52, and Tom Smith (e.g., by requiring their attendance at midnight). Accordingly, equitable scheduling process 10 may associate 102 a disruption factor indicating likely disruption (e.g., a disruption factor of "1") with each of user 48, user 50, user 52, and Tom Smith. Additionally, equitable scheduling process 10 may associate 102 a disruption factor indicating unlikely disruption (e.g., a disruption factor of "0") with each of user 46 and Anthony Michaels.

While the foregoing example includes a single disruption factor indicating likely disruption and a single disruption factor indicating unlikely disruption, this is for illustrative purposes only and should not be construed as a limitation of the present disclosure. For example, disruption factors may be graduate, e.g., to indicate varying likelihood of disruption. Additionally/alternative, non-numerical disruption factors and/or indicators may be utilized.

Associating 102 the disruption factor with each of the plurality of invitees may include associating 106 a weighting factor with each of the plurality of event invitees. According to one aspect, the weighting factor may be based upon an anticipated contribution by an individual invitee, e.g., in terms of whether the invitee is a required invitee or an optional invitee, and whether the invitee is likely to attend the meeting. As such, the weighting factor may, for example, be utilized to reduce users from "gaming" the invitees of the event to achieve a favorable time or location. For example, numerous invitees from a desired location, who may be unlikely to attend the event, may be invited, thereby making it appear as though the meeting may be convenient for the majority of the invitees.

A weighting factor based upon, at least in part, an invitees status as a required invitee or an optional invitee (e.g., as indicated by checkboxes 168) may reduce weighting of the disruption factor associated with an optional invitee and/or may increase the weighting of the disruption factor associated 102 with a required invitee. For example, as shown in FIG. 3, user 52 may be an optional invitee (e.g., based upon an unchecked checkbox). According to one example, in determining an average disruption value for the meeting, the disruption factor associated with user 52 may only be given half-weight.

Similarly, a weighting factor associated 106 with an invitee who is unlikely to attend the event may reduce the weighting of the disruption factor associated 102 with the invitee, and/or a weighting factor associated 106 with an invitee who is likely to attend the event may increase the weighting of the disruption factor associated 102 with the invitee. The likelihood that an invitee will in fact attend the event may be based upon, for example, a history of attendance at events to which the invitee has been invited. Further, equitable scheduling process 10 (alone or in conjunction with calendaring server application 20 and/or calendaring client application 22) may poll the plurality of invitees, requiring the plurality of invitees to indicate an intention to attend or to not attend. Further, equitable scheduling process 10 (alone or in conjunction with calendaring server application 20 and/or calendaring client application 22) may additionally, monitor a change in status of each of plurality of invitees. For example, should an invitee initially accept an invitation to the event and later change the acceptance to a decline, equitable scheduling process 10 may associate 106 a weighting factor with the invitee indicative of a likelihood of non-attendance (e.g., in a post hoc manner).

Additionally, the weighting factor may be based upon, at least in part, an invitee characteristic. The invitee characteristic may be based upon, at least in part, a policy for determining individuals whose time is considered more valuable, and who may be required to suffer fewer disruptions. For example, Anthony Michaels may be a department head, and as such his time may be considered to be very valuable. Accordingly, equitable scheduling process 10 may associate 106 a weighting factor with the disruption factor associated 102 with Anthony Michaels, e.g., which give more weight to the disruption factor associated 102 with Anthony Michaels. For example, a weighting factor associated 106 with Anthony Michaels may weight the disruption factor associated 102 with Anthony Michaels to count as a full additional person having the same disruption factor as associated 102 with Anthony Michaels. Of course, various additional and/or alternative weighting schemes may be equally utilized.

As generally stated above, weighting factors may be based upon, at least in part an invitee characteristic. The invitee characteristic may relate to a position of the invitee within an organization (such as a corporation), and/or may relate to a relative status of an invitee relative to the other invitees (e.g., based on rank, pay grade, seniority, or other characteristic that may be established, e.g., by a system administrator). Invitee characteristics may be accessible by equitable scheduling process 10, e.g., via an organizational directory (such as a corporate LDAP directory), user profiles, or the like. Further, invitee characteristics may include interfering meetings (e.g., based upon information extracted from calendaring server application 20). Weighting factors may be associated with an invitee based upon, at least in part, various additional/alternative characteristics.

Equitable scheduling process 10 may schedule 104 an event (e.g., the meeting) based upon, at least in part, the disruption factors associated with each invitee. For example, equitable scheduling process 10 may determine an average of the weighted disruption factor of the plurality of invitees. Consistent with the above-described example, user 48, user 50, user 52, and Tom Smith may have an associated 102 disruption factor of "1", user 46 may have an associated 102 disruption factor of "0", and Anthony Michaels may have an associated 102 disruption factor of "0" and an associated 106 weighting factor doubling the weight of the associated 102 disruption factor. Accordingly, the average disruption factor may be 4/7 or about 57%, indicating that the meeting may be disruptive for more than half of the plurality of invitees.

Further as discussed above, a weighting factor may also be associated 106 with each of the plurality of invitees, for example, based upon, at least in part, whether each invitee is a required invitee or an optional invitee. In an embodiment in which required invitees may be given full weighting and optional invitees may be given half weighting (and counting the associated 106 weighting factor doubling the weight of the disruption factor associated 102 with Anthony Michaels), an average of the disruption factors associated 102 with each of the plurality of invitees may be 3/5.5 or about 55%. Therefore, even considering the associated 106 weighting factor based upon, at least in part, an invitees required or optional status, the average of the weighted disruption factors may indicate that the meeting, as proposed, may be disruptive for more than half of the plurality of invitees.

Figure 4:
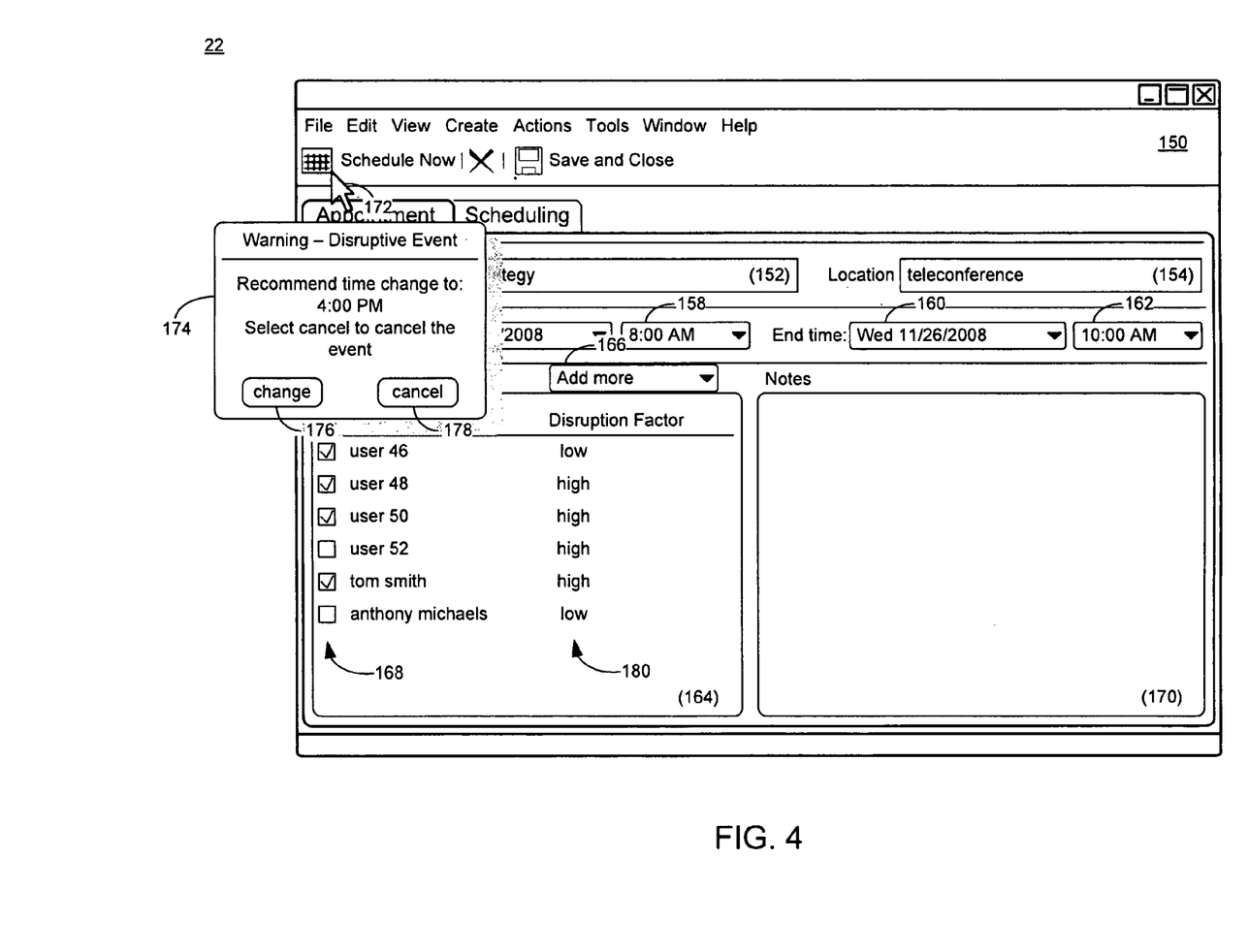
FIG. 4 diagrammatically depicts a scheduling user interface, including a prompt of disruptive factors, that may be rendered by an the equitable scheduling process and/or the calendaring application of FIG. 1.

Scheduling 104 the event based upon, at least in part, the disruption factors associated with each of the plurality of invitees may include recommending 108 one or more of an alternative time and an alternative location. Continuing with the above-stated example, even considering associated 106 weighting factors, the meeting may be disruptive for more than half of the plurality of invitees. Additionally, in the above-example, the meeting may be inconvenient based upon, at least in part, a difference in the time zones of the plurality of invitees. As such, one possible way to make the meeting less disruptive may be to move the time. Referring also to FIG. 4, equitable scheduling process 10 (alone or in conjunction with one or more of calendaring client application 22 and/or calendaring server application 20) may render warning 174. Via warning 174, equitable scheduling process 10 may recommend 108 rescheduling the event to 4:00 PM Eastern Standard Time, e.g., which may be 8:00 AM in Sydney, Australia. The recommended 108 time may be within (or closer to) normal business hours for all of the invitees, and may therefore be a less disruptive time for user 48, user 50, user 52, and Tom Smith.

Equitable scheduling process 10 may recommend 108 various additional/alternative resolutions for decreasing the disruptiveness of the meeting. Examples of such recommendations may include splitting the meeting into multiple meetings (e.g., with each of the multiple meetings respectively including only those individuals for whom the meeting would be commonly non-disruptive), uninviting optional invitees, or the like. Additionally, in a situation in which the event (e.g., the meeting) is a recurring event (such as a monthly meeting), equitable scheduling process 10 may additionally/alternatively recommend 108, for example, rotating the time of the meeting between a preferred time for a first group of invitees and a preferred time for a second group of invitees. As such, over time the disruption may be equally shared by all invitees.

With continued reference to FIG. 4, equitable scheduling process 10 may enforce 110 one or more of the alternative time and the alternative location. For example, warning 174, which may include a recommended 108 alternative time, may only include the options to accept the recommended 108 alternative time (e.g., by selecting change button 176) or to cancel the event completely (e.g., by selecting cancel button 178). In the event that user 46 chooses to cancel the event (e.g., by selecting cancel button 178 using onscreen pointer 172), user 46 may try to create a new event at a different time (e.g., of user 46's choosing rather than the time recommended 108 by equitable scheduling process 10), and/or including a different set of invitees, e.g., which may result in a less disruptive event.

Additionally/alternatively, and with continued reference to FIG. 4, equitable scheduling process 10 may provide and individualized disruption factor, 180, generally, associated with each of the plurality of invitees. While disruption factor 180 is shown including designators "low" and "high" (e.g., and which may similarly include the designator "med"), this should not be construed as a limitation of the present disclosure as the disruption factor associated with each of the plurality of invitees may include various additional/alternative designators (e.g., numerical, color coded flags, etc.).

Figure 5:
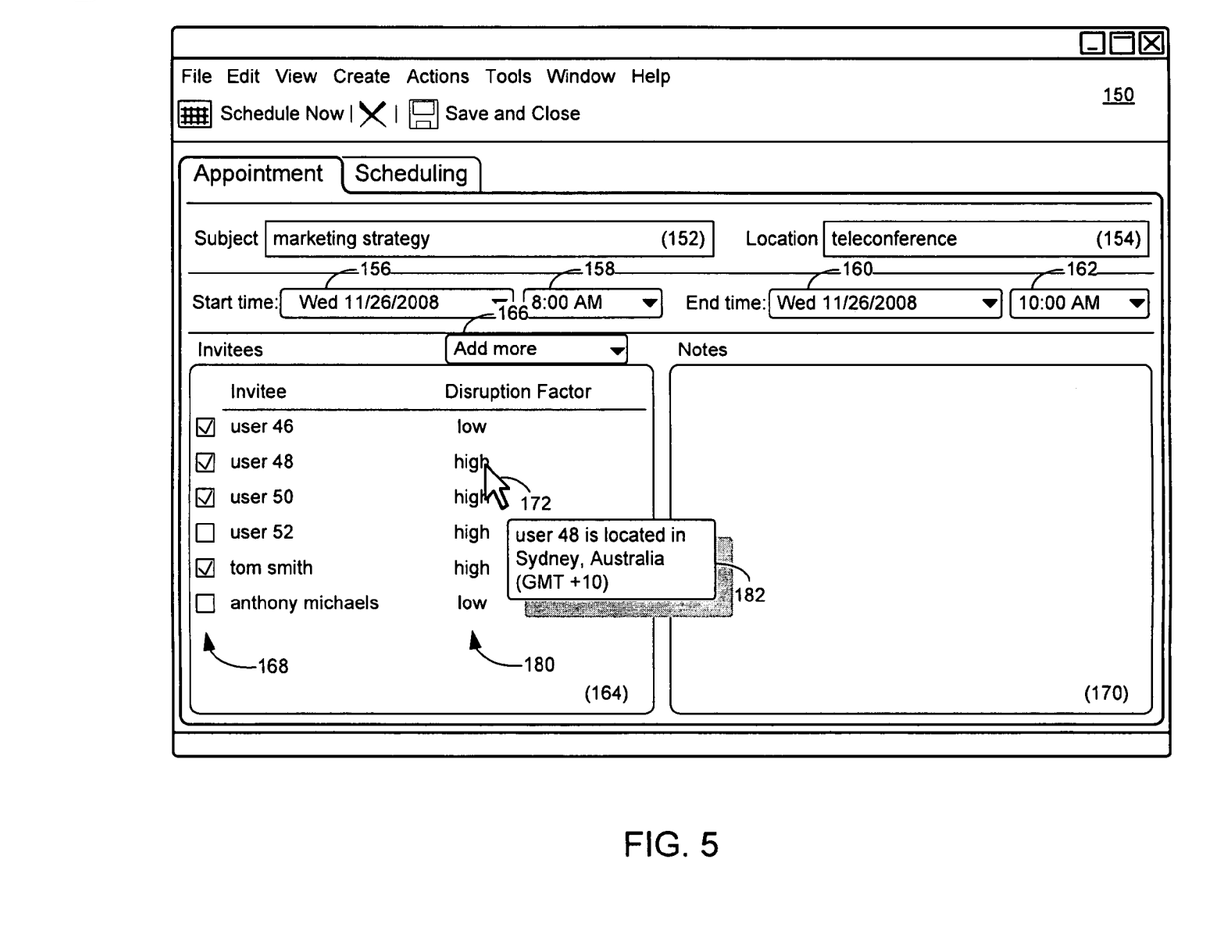
FIG. 5 diagrammatically depicts a scheduling user interface that may be rendered by the equitable scheduling process and/or the calendaring application of FIG. 1.

In addition to providing an indicator of how disruptive the meeting is for the various invitees, each disruption factor 180 may be interrogated by user 46, e.g., to ascertain the nature of the disruption giving rise to the disruption factor. For example, and referring also to FIG. 5, user 46 may "right-click" on disruption factor 180 associated with user 48, resulting in equitable scheduling process 10 (alone or in conjunction with one or more of calendaring server application 20 and/or calendaring client application 22) rendering pop-up 182. Pop-up 182 may include information relating to the disruption factor (e.g., "user 48 is located in Sydney, Australia (GMT+10)"), recommendations for reducing the disruption factor associated user 48, and the like.

Enforcing 110 one or more of the alternative time and the alternative location may be based upon, at least in part, policies that may be established, e.g., system wide, for specific users, and/or specific groups of users. Such policies may be established by, for example, a system administrator, or the like. For example, a system administrator may associate policies with electronic meetings, such that organizational policies around disruption factors may be enforced. For example, an organization policy to minimize the disruption factor based on majority may be chosen by and administrator and may be applied to all electronic meetings automatically. This may result in the meeting scheduler not being able to refute meeting times that suited the majority from a "least disruption" perspective. Further, filters may be set (e.g., by the system administrator), such that certain individuals may be excluded from being disrupted. For example, a filter may be set such that an executive, or other "important" individual may not be disrupted, even if such a disruption would suit the majority of the invitees.

Additionally, once the event has been scheduled 104, equitable scheduling process 10 (alone or in conjunction with one or more of calendaring client application 22 and/or calendaring server application 20) may save 112 the scheduled event on a computer readable medium coupled to a computing device (e.g., storage device 30 coupled to client electronic device 38, storage device 16 coupled to server computer 12, or the like).

The foregoing description has generally related to a generally real-time implementation in order to motivate corrections during the act of scheduling, e.g., in which equitable scheduling process 10 may associate 102 a disruption factor with each of the plurality of invitees and may schedule 104 the event based upon, at least in part, the disruption factor associated 102 with each of the plurality of invitees while a user (e.g., user 46) is scheduling the event via calendaring client application 22 (alone or in conjunction with calendaring server application 20).

Additionally/alternatively, equitable scheduling process 10 may be implemented in a post hoc manner. For example, once a user (e.g., user 46) has scheduled the event (e.g., a meeting) via calendaring user interface 150, invitations may be sent to the plurality of invitees, in a generally conventional manner. Upon receiving (and/or at some point in time after receiving) an invitation to the meeting, one or more invitee may make a request to arbitrate a new time and/or location for the meeting. Upon making the request to arbitrate a new time and/or location for the meeting, equitable scheduling process 10 may associate a disruption factor with the invitee (and/or additional invitees of the meeting). Equitable scheduling process 10 may schedule 104 the event including recommending 108 (e.g., to user 46 and/or to all invitees of the meeting) and alternative time and/or location for the meeting.

Further, in addition to motivating equitable behavior in calendaring events, equitable scheduling process 10 may collect information regarding scheduled meetings, as well as attempted scheduled meetings, over a period of time. This information may be aggregated and stored (e.g., on storage device 16 coupled to server computer 12). The aggregated information may be analyzed (e.g., by equitable scheduling process), for example, to determine anomalies (e.g., which may include disruptive meetings and/or attempts at scheduling disruptive meetings). The determined anomalies may allow systemic decisions and actions, e.g., to rectify such anomalies and/or address causes of such anomalies.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product comprising a non-transitory computer readable medium having a plurality of instructions stored thereon, which, when executed by a processor, cause the processor to perform operations comprising:
   receiving an event scheduling request from a user, wherein the event scheduling request includes one or more parameters of an event;
   in response to receiving the event scheduling request, associating a disruption factor with each of a plurality of invitees, the disruption factor based upon, at least in part, the one or more parameters of the event and at least one invitee attribute, each disruption factor corresponding to a likelihood that a proposed event time for the event is disruptive to one of the plurality of invitees, wherein associating the disruption factor with each of the plurality of invitees includes associating a weighting factor with each of the plurality of invitees, wherein each required invitee is given full weighting and each optional invitee is given half weighting;
displaying a level of the disruption factor for each of the plurality of invitees for the event;
receiving an interrogation request relative to the displayed level of the disruption factor of at least one of the plurality of invitees;
ascertaining a cause of the disruption factor for at least one of the plurality of invitees for the event, and displaying the cause of the disruption factor with the disruption factor level via a pop-up associated with the at least one of the plurality of invitees;
providing a recommendation for reducing the disruption factor of the at least one of the plurality of invitees; and
scheduling the event based upon, at least in part, an input from the user and the disruption factors associated with each of the plurality of invitees.

2. The computer program product of claim 1, wherein the one or more parameters of the event comprises one or more of an event date, an event time, an event duration, and an event location.

3. The computer program product of claim 1, wherein the at least one invitee attribute comprises a time zone location of an invitee.

4. The computer program product of claim 1, wherein the weighting factor is based upon, at least in part, an invitee characteristic.

5. The computer program product of claim 1, further comprising instructions for enforcing one or more of the alternative date, the alternative time and the alternative location.

6. A computing system comprising:
a processor;
a memory module coupled with the processor;
a first software module executable by the processor and the memory module, wherein the first software module is configured to receive an event scheduling request from a user, wherein the event scheduling request includes one or more parameters of an event;
a second software module executable by the processor and the memory module, wherein the second software module is configured to, in response to receiving the event scheduling request, associate a disruption factor with each of a plurality of invitees, the disruption factor based upon, at least in part, the one or more parameters of the event and at least one invitee attribute, each disruption factor corresponding to a likelihood that a proposed event time for the event is disruptive to one of the plurality of invitees, wherein associating the disruption factor with each of the plurality of invitees includes associating a weighting factor with each of the plurality of invitees, wherein each required invitee is given full weighting and each optional invitee is given half weighting;
a third software module executable by the processor and the memory module, wherein the third software module is configured to display a level of the disruption factor for each of the plurality of invitees for the event;
a fourth software module executable by the processor and the memory module, wherein the fourth software module is configured to receive an interrogation request relative to the displayed level of the disruption factor of at least one of the plurality of invitees;
a fifth software module executable by the processor and the memory module, wherein the fifth software module is configured to ascertain a cause of the disruption factor for the at least one of the plurality of invitees for the event, and further configured to display the cause of the disruption factor with the disruption factor level via a pop-up associated with the at least one of the plurality of invitees;
a sixth software module executable by the processor and the memory module, wherein the sixth software module is configured to provide a recommendation for reducing the disruption factor of the at least one of the plurality of invitees; and
a seventh software module executable by the processor and the memory module, wherein the seventh software module is configured to schedule the event based upon, at least in part, an input from the user and the disruption factors associated with each of the plurality of invitees.

7. The computing system of claim 6, wherein the one or more parameters of the event comprises one or more of an event date, an event time, an event duration, and an event location.

8. The computing system of claim 6, wherein the at least one invitee attribute comprises a time zone location of an invitee.

9. The computing system of claim 6, wherein the weighting factor is based upon, at least in part, an invitee characteristic.

10. The computing system of claim 6, further comprising an eighth software module executable by the processor and the memory module, wherein the eighth software module is configured to enforce one or more of the alternative date, the alternative time and the alternative location.

11. A computer implemented method comprising:
receiving, via one or more computing devices, an event scheduling request from a user, wherein the event scheduling request includes one or more parameters of an event;
in response to receiving the event scheduling request, associating, via the one or more computing devices, a disruption factor with each of a plurality of invitees, the disruption factor based upon, at least in part, one or more parameters of the event and at least one invitee attribute, each disruption factor corresponding to a likelihood that a proposed event time for the event is disruptive to one of the plurality of invitees, wherein associating the disruption factor with each of the plurality of invitees includes associating a weighting factor with each of the plurality of invitees, wherein each required invitee is given full weighting and each optional invitee is given half weighting;
displaying a level of the disruption factor for each of the plurality of invitees for the event;
receiving an interrogation request relative to the displayed level of the disruption factor of at least one of the plurality of invitees;
ascertaining a cause of the disruption factor for the at least one of the plurality of invitees for the event, and displaying the cause of the disruption factor with the disruption factor level via a pop-up associated with the at least one of the plurality of invitees;
providing a recommendation for reducing the disruption factor of the at least one of the plurality of invitees; and
scheduling, via the one or more computing devices, the event based upon, at least in part, an input from the user and the disruption factors associated with each of the plurality of invitees.

12. The computer implemented method of claim 11, wherein the one or more parameters of the event comprises one or more of an event date, an event time, an event duration, and an event location.

13. The computer implemented method of claim 11, wherein the at least one invitee attribute comprises a time zone location of an invitee.

14. The computer implemented method of claim 11, further comprising enforcing one or more of the alternative date, the alternative time and the alternative location.

* * * * *